United States Patent
Hon et al.

(10) Patent No.: US 11,534,879 B2
(45) Date of Patent: Dec. 27, 2022

(54) PROCESSING METHOD AND OBJECT

(71) Applicant: FANUC CORPORATION, Minamitsuru-gun (JP)

(72) Inventors: Yonpyo Hon, Yamanashi-ken (JP); Akira Yamamoto, Yamanashi-ken (JP); Yasuhiro Sakaida, Yamanashi-ken (JP); Masahiro Murota, Yamanashi-ken (JP); Ryuu Iwatate, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 233 days.

(21) Appl. No.: 17/096,677

(22) Filed: Nov. 12, 2020

(65) Prior Publication Data
US 2021/0146493 A1  May 20, 2021

(30) Foreign Application Priority Data
Nov. 15, 2019 (JP) .............................. JP2019-206632

(51) Int. Cl.
  *B23Q 15/14* (2006.01)
  *B23Q 17/20* (2006.01)
(52) U.S. Cl.
  CPC ............. *B23Q 15/14* (2013.01); *B23Q 17/20* (2013.01); *B23Q 2717/00* (2013.01)
(58) Field of Classification Search
  None
  See application file for complete search history.

(56) References Cited

U.S. PATENT DOCUMENTS

| | | | |
|---|---|---|---|
| 2009/0229439 A1 | 9/2009 | Hamura et al. | |
| 2011/0026208 A1* | 2/2011 | Utsuro | G03H 1/0244 |
| | | | 428/167 |

FOREIGN PATENT DOCUMENTS

| | | |
|---|---|---|
| JP | 2001-087921 A | 4/2001 |
| JP | 2004-086073 A | 3/2004 |
| JP | 2009-160898 A | 7/2009 |
| JP | 2009-214243 A | 9/2009 |
| JP | 2010-012520 A | 1/2010 |
| JP | 2010-054760 A | 3/2010 |
| JP | 2013-044984 A | 3/2013 |

\* cited by examiner

*Primary Examiner* — Ryan A Jarrett
(74) *Attorney, Agent, or Firm* — McGinn I.P. Law Group, PLLC.

(57) ABSTRACT

A processing method includes: a step of setting a workpiece having a workpiece surface made of a material containing metal, on a precision processing machine; and a forming step of forming multiple grooves having a V-shaped cross-section, at intervals of a constant pitch in a predetermined area on the workpiece surface, using a tool provided in the precision processing machine to thereby form a V-groove pattern made up of the multiple grooves, in the predetermined area. In the forming step, each time one groove is formed, the relative position between the tool and the workpiece is moved in a direction intersecting the longitudinal direction of the groove and the angle of the groove face of the groove is gradually varied so that a uniform color can be visually recognized in every location in the predetermined area when the predetermined area is observed from a predetermined viewpoint.

8 Claims, 7 Drawing Sheets

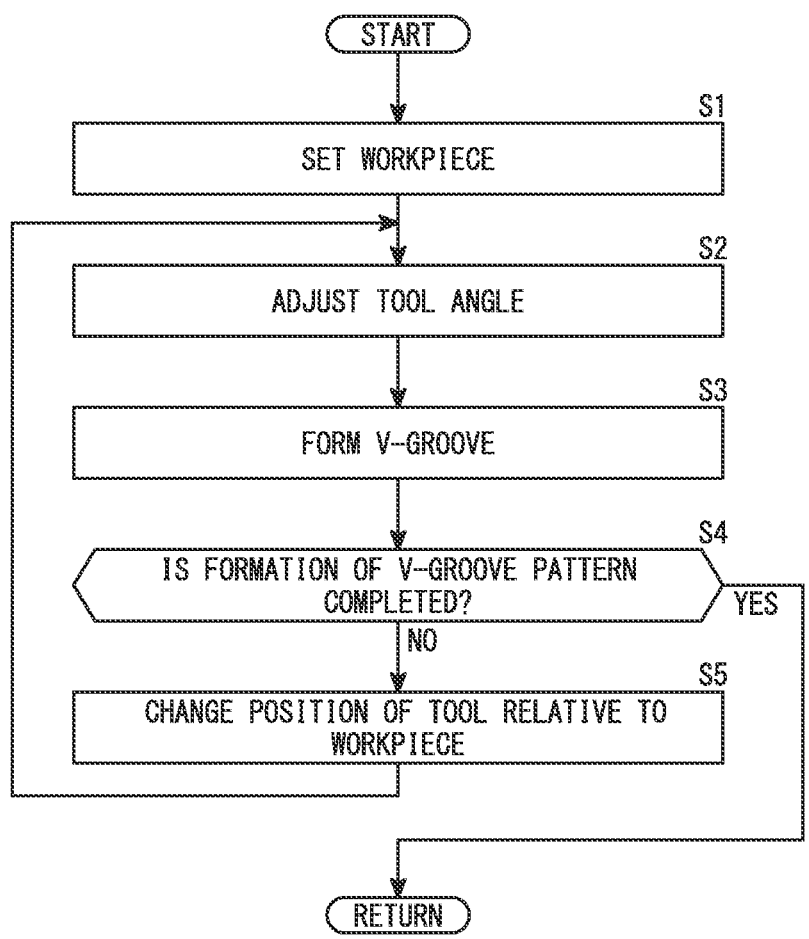

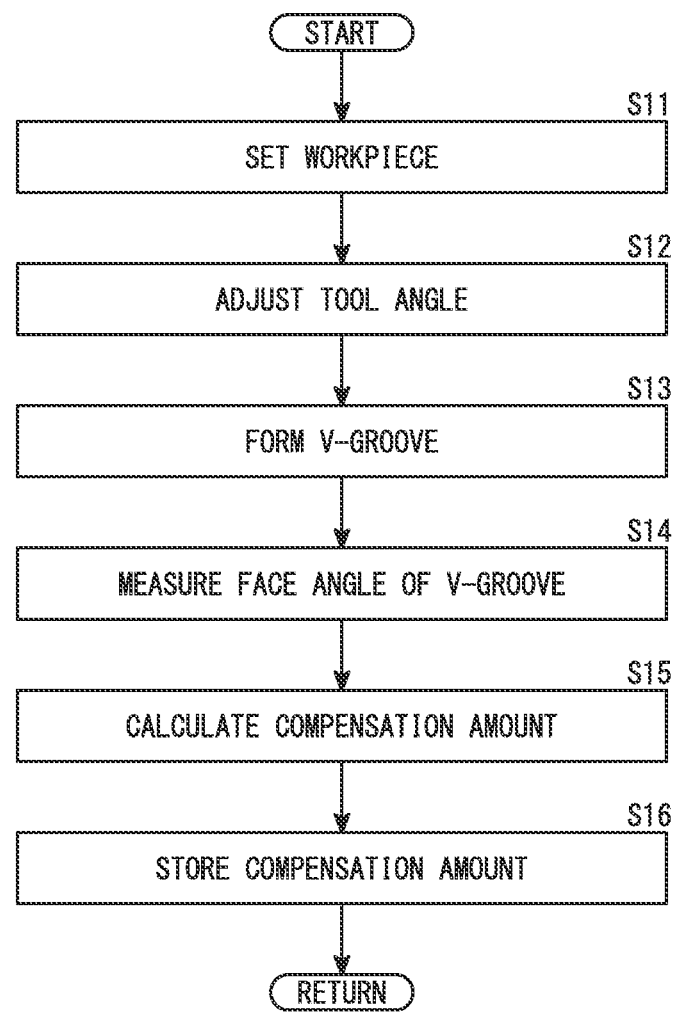

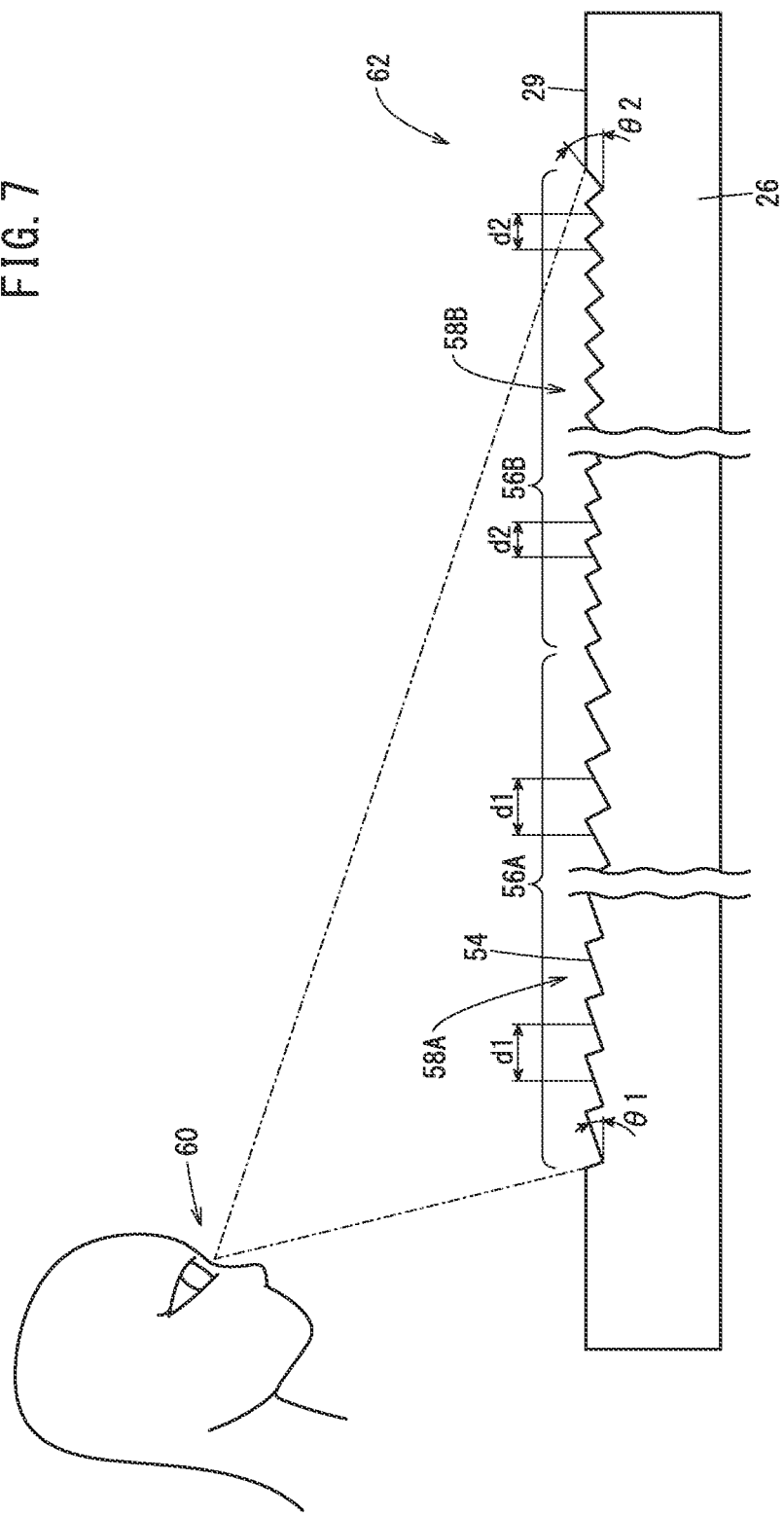

PROCESSING METHOD AND OBJECT

CROSS-REFERENCE TO RELATED APPLICATION

This application is based upon and claims the benefit of priority from Japanese Patent Application No. 2019-206632 filed on Nov. 15, 2019, the contents of which are incorporated herein by reference.

BACKGROUND OF THE INVENTION

Field of the Invention

The present invention relates to a processing method and an object.

Description of the Related Art

Japanese Laid-Open Patent Publication No. 2010-012520 discloses a processing method in which a surface of a solid material (workpiece) is cut by moving a processing tool in a pulse-driven state relative to the surface of the workpiece and bringing them into contact with each other, thereby forming a fine structure on the surface of the solid material. In Japanese Laid-Open Patent Publication No. 2010-012520, drive pulses generated at a fixed time interval are applied while the processing tool and the processed object (workpiece) are being moved at a fixed relative speed, whereby fine grooves are formed at equal intervals.

SUMMARY OF THE INVENTION

However, the fine structure formed by the processing method disclosed in Japanese Laid-Open Patent Publication No. 2010-012520 does not allow a uniform color to be visually recognized.

It is therefore an object of the present invention to provide a processing method and an object capable of forming a V-groove pattern that can be visually recognized as a uniform color.

A processing method according to one aspect of the invention includes: a step of setting a workpiece having a workpiece surface made of a material containing metal, on a precision processing machine; and a forming step of forming a plurality of grooves having a V-shaped cross-section, at intervals of a constant pitch in a predetermined area on the workpiece surface, using a tool provided in the precision processing machine to thereby form a V-groove pattern including the plurality of grooves, in the predetermined area, wherein, in the forming step, each time one of the grooves is formed, relative position between the tool and the workpiece is moved in a direction intersecting a longitudinal direction of the groove, and each time the groove is formed, an angle of a groove face of the groove is gradually varied so that a uniform color can be visually recognized in every location in the predetermined area when the predetermined area is observed from a predetermined viewpoint.

An object according to another aspect of the invention has a workpiece surface made of a material containing metal, the object including a V-groove pattern formed in a predetermined area on the workpiece surface, the V-groove pattern having a plurality of grooves of a V-shaped cross-section which are formed at intervals of a constant pitch, wherein an angle of a groove face of the groove is gradually varied depending on the position of the groove so that a uniform color can be visually recognized in every location in the predetermined area when the predetermined area is observed from a predetermined viewpoint.

According to the present invention, it is possible to provide a processing method and an object which are capable of producing a V-groove pattern that enables a uniform color to be visually recognized.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a flowchart showing a processing method according to the embodiment;

FIG. 6 is a flowchart showing a process performed to determine a compensation amount; and, FIG. 7 is a sectional view showing another example of an object formed by the processing method according to the embodiment.

DESCRIPTION OF THE PREFERRED EMBODIMENTS

A processing method and an object according to the present invention will be detailed below by describing a preferred embodiment with reference to the accompanying drawings.

Embodiment

Figure 1:
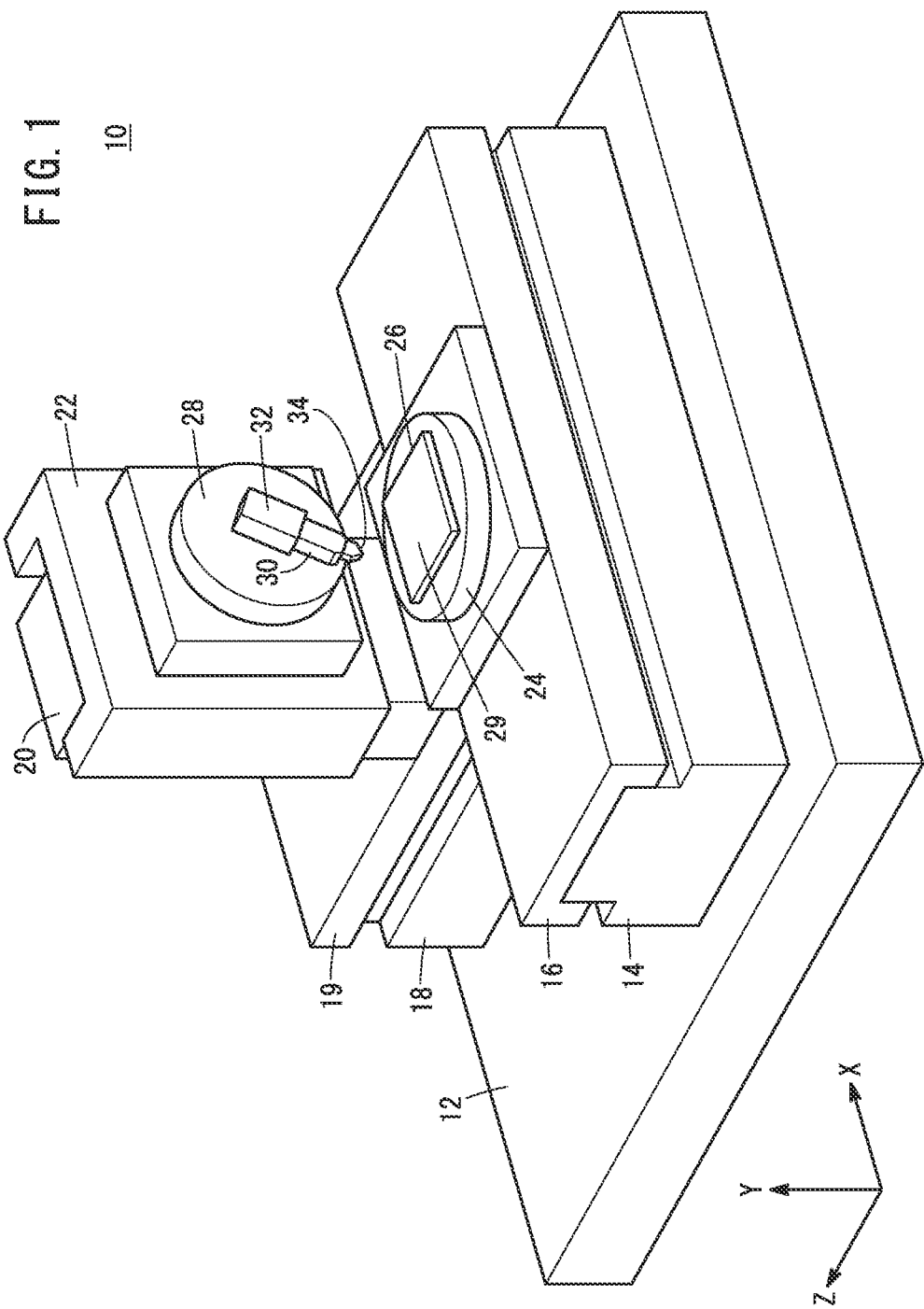
FIG. 1 is a perspective view showing part of an ultra-precision processing machine that can be used in a processing method according to an embodiment.

A processing method (machining method) and an object according to an embodiment will be described with reference to the drawings. FIG. 1 is a perspective view showing part of an ultra-precision processing machine that can be used in the processing method according to the present embodiment.

As shown in FIG. 1, an ultra-precision processing machine (precision processing machine) 10 has a base 12. The base 12 is fixed at an installation position of the ultra-precision processing machine 10.

The ultra-precision processing machine 10 further includes an X-axis moving unit 16 that can be driven in the X-axis direction. The X-axis direction is the left-right direction in FIG. 1. The X-axis moving unit 16 can be driven by a drive source 46X (see FIG. 2). A servomotor or the like can be used as the drive source 46X, but the drive source 46X is not limited to this. The X-axis moving unit 16 can be driven in the X-axis direction along an X-axis guide 14 fixed to the base 12.

The ultra-precision processing machine 10 further includes a Z-axis moving unit 19 that can be driven in the Z-axis direction. The Z-axis direction is the depth direction in FIG. 1. The Z-axis moving unit 19 can be driven by a drive source 46Z (see FIG. 2). As the drive source 46Z, a servomotor or the like can be used, but the drive source 46Z is not limited to this. The Z-axis moving unit 19 can be driven in the Z-axis direction along a Z-axis guide 18 fixed to the base 12.

The ultra-precision processing machine 10 further includes a Y-axis moving unit 22 that can be driven in the Y-axis direction. The Y-axis direction is the vertical direction in FIG. 1. The Y-axis moving unit 22 can be driven by a drive source 46Y (see FIG. 2). A servomotor or the like can be used as the drive source 46Y, but the drive source 46Y is not limited to this. The Y-axis moving unit 22 can be driven in the Y-axis direction along a Y-axis guide 20 fixed to the Z-axis moving unit 19.

The ultra-precision processing machine 10 further includes a B-axis table 24. The B axis is a rotation axis parallel to the Y-axis. The B-axis table 24 can be driven by a drive source 46B (see FIG. 2). The B-axis table 24 is provided on the X-axis moving unit 16. The B-axis table 24 is rotatable around the B axis.

A workpiece 26 can be fixed on the B-axis table 24. By rotating the B-axis table 24, the angles of the workpiece 26 with respect to the X-axis direction and the Z-axis direction can be adjusted.

The ultra-precision processing machine 10 further includes a C-axis table 28. The C axis is a rotation axis parallel to the Z axis. The C-axis table 28 can be driven by a drive source 46C (see FIG. 2). The C-axis table 28 is provided on the Y-axis moving unit 22. The C-axis table 28 is rotatable around the C axis.

The C-axis table 28 includes a holder 32 for holding a tool 30. The holder 32 holds the tool 30. The tool 30 is fixed to the C-axis table 28 via the holder 32. The tool 30 is, for example, a single crystal diamond tool bit having a cutting edge (tool bit cutting edge) 34 made of single crystal diamond, but the tool 30 is not limited thereto. By rotating the C-axis table 28, the angle of the cutting edge 34 of the tool 30 with respect to a workpiece surface (a surface to be machined, a machined surface) 29 of the workpiece 26 can be changed (adjusted).

By appropriately driving the X-axis moving unit 16 and the Z-axis moving unit 19, the cutting edge 34 of the tool 30 can be positioned directly above a desired point on the workpiece 26. Rotation of the C-axis table 28 enables adjustment of the angle of the cutting edge 34 of the tool 30. By appropriately driving the Y-axis moving unit 22, the cutting edge 34 can be brought into contact with the workpiece surface 29 of the workpiece 26. By driving the Z-axis moving unit 19 with the cutting edge 34 in contact with the workpiece surface 29 of the workpiece 26, a groove having a V-shaped cross section, that is, a V-groove 54 (FIG. 4), can be formed in the workpiece surface 29 of the workpiece 26. The angle of the V-groove 54 depends on the angle of the cutting edge 34 of the tool 30. The longitudinal direction of the V-groove 54 is in parallel to the Z-axis direction. By repeating such an operation as appropriate, a V-groove pattern 58 (see FIG. 4) composed of a plurality of V-grooves 54 can be formed on the workpiece surface 29 of the workpiece 26.

Figure 2:
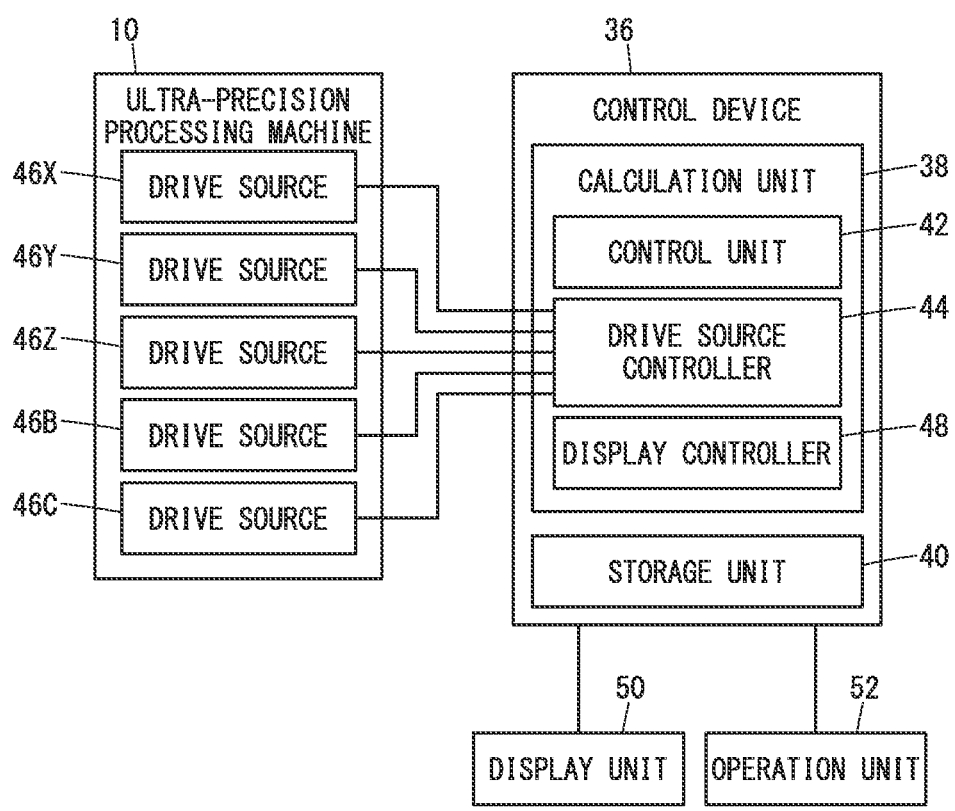
FIG. 2 is a block diagram showing the ultra-precision processing machine that can be used in the processing method according to the embodiment.

FIG. 2 is a block diagram showing the ultra-precision processing machine that can be used in the processing method according to the present embodiment.

As shown in FIG. 2, the ultra-precision processing machine 10 further includes a control device 36. The control device 36 further includes a calculation unit 38 and a storage unit 40. The calculation unit 38 may be configured by, for example, a CPU (Central Processing Unit) or the like, but is not limited thereto. The calculation unit 38 includes a control unit 42, a drive source controller 44 and a display controller 48. The control unit 42, the drive source controller 44 and the display controller 48 can be realized by the calculation unit 38 executing the program stored in the storage unit 40.

The storage unit 40 includes, for example, an unillustrated volatile memory and an unillustrated non-volatile memory. Examples of the volatile memory include a RAM (Random Access Memory) and the like. Examples of the non-volatile memory include a ROM (Read Only Memory), a flash memory, and the like. Programs, data, and the like can be stored in the storage unit 40. The pitch command value, the angle command value, the compensation amount, and the like, which will be described later, can also be stored in the storage unit 40.

The control unit 42 performs overall control of the ultra-precision processing machine 10. The control unit 42 appropriately supplies command values to the drive source controller 44. The drive source controller 44 drives the drive sources 46X, 46Y, 46Z, 46B, 46C based on the command values supplied from the control unit 42. Thus, the X-axis moving unit 16, the Y-axis moving unit 22, the Z-axis moving unit 19, the B-axis table 24, and the C-axis table 28 are appropriately driven, so that V-grooves 54 are formed in a predetermined area 56 on the workpiece surface 29 of the workpiece 26, as appropriate (see FIG. 4).

The control unit 42 can supply a command value as to a pitch d of the V-groove 54, that is, the pitch command value, to the drive source controller 44. The pitch command value may be supplied to the drive source controller 44 each time the V-groove 54 is formed. The pitch command values are stored in advance in the storage unit 40. The control unit 42 sequentially reads a pitch command value from the storage unit 40, and supplies the read pitch command value to the drive source controller 44.

The drive source controller 44 moves the X-axis moving unit 16 in the X-axis direction based on the pitch command value. As a result, the pitch d of the V-groove 54 can be set. The pitch command value can be set by a unit of 0.1 nm or less, for example. Since the unit of the pitch command value is extremely small, the pitch d of the V-groove 54 can be set with extremely high accuracy.

The control unit 42 can supply an angle command value, in other words, a command value as to the angle of a groove face (which will be also referred to the groove face angle) of the V-groove 54 with respect to the workpiece surface 29, to the drive source controller 44. The angle command value is a command value relating to the angle of one of the two groove faces forming the V-groove 54. The angle command value may be supplied to the drive source controller 44 each time the V-groove 54 is formed. The angle command values are stored in advance in the storage unit 40. The control unit 42 sequentially reads an angle command value for each V-groove 54 from the storage unit 40, and supplies the read angle command value to the drive source controller 44. A compensation amount for the angle command value, described later, may be determined in advance. When the compensation amount has been determined in advance, the control unit 42 compensates the angle command value read from the storage unit 40 with the compensation amount, and supplies the compensated angle command value to the drive source controller 44.

The drive source controller 44 rotates the C-axis table 28 about the C-axis based on the angle command value. By rotation of the C-axis table 28 about the C-axis, the angle of the cutting edge 34 of the tool 30 is set. Since the V-groove 54 is formed by using the cutting edge 34 of the tool 30, the V-groove 54 is formed so as to have a groove angle corresponding to the angle of the cutting edge 34 of the tool 30. The angle command value can be set by a unit of 0.000001 degrees or less, for example. Since the unit of the angle command value is extremely small, the groove face angle of the V-groove 54 can be set with extremely high accuracy.

A display unit 50 may be connected to the control device 36. The display controller 48 can display an operation window, operating condition settings, and the like of the ultra-precision processing machine 10, on the display screen of the display unit 50. The display unit 50 may be configured of, for example, a liquid crystal display or the like, but is not limited thereto.

An operation unit 52 may be connected to the control device 36. The operation unit 52 may be composed of, for example, a keyboard, a mouse, and the like, but is not limited thereto. The operation unit 52 may be configured with an unillustrated touch panel provided on the screen of the display unit 50. The user may give a command to the ultra-precision processing machine 10 via the operation unit 52. The user can input the compensation amount for the angle command value by operating the operation unit 52.

Figure 3:
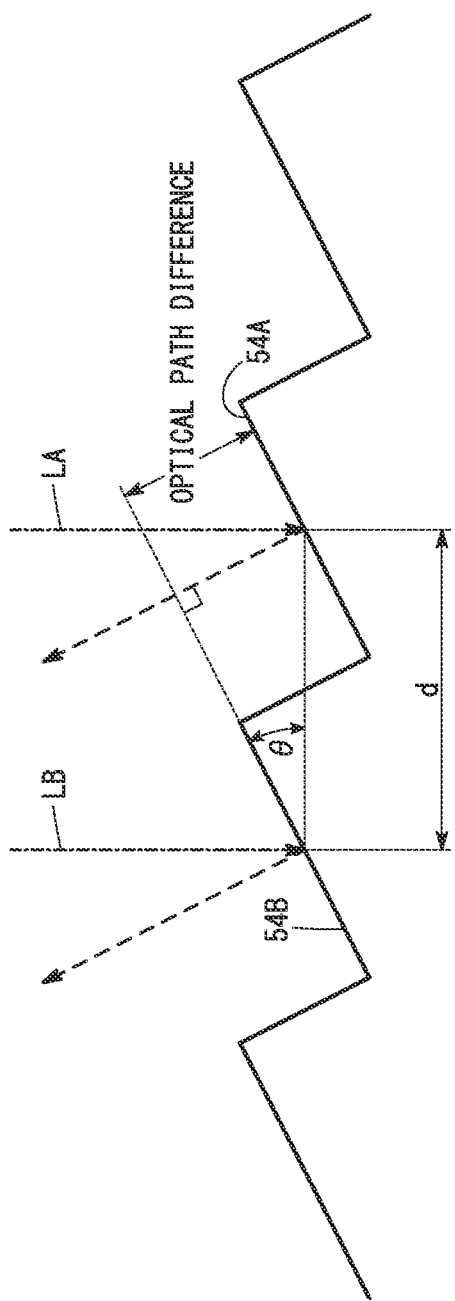
FIG. 3 is a diagram showing a mechanism by which a specific color is visually recognized.

FIG. 3 is a diagram showing a mechanism by which a specific color is visually recognized. Here, explanation will be given focusing on incident light beams LA and LB entering respectively the V-grooves 54A and 54B adjacent to each other. A reference numeral 54 is used to refer to the V-groove in general, and reference numerals 54A and 54B are used to describe the V-grooves individually. As shown in FIG. 3, the incident light beams LA and LB are incident on and reflected by the groove faces of the V-grooves 54A and 54B, respectively. Assuming that the pitch of the V-grooves 54 is d and the groove face angle (groove face inclination) of the V-groove 54 with respect to the workpiece surface 29 is θ, the optical path difference between the light beams LA and LB reaching a predetermined viewpoint 60 (see FIG. 4) after being reflected by the respective V-grooves 54A and 54B, is d·sin θ. Assuming that m is an integer, light beams of a wavelength λ constructively interfere with each other when the following condition (1) is satisfied. Therefore, the diffracted light having the wavelength λ reaches the predetermined viewpoint 60. Since the diffracted light of the wavelength λ reaches the predetermined viewpoint 60, the color corresponding to the wavelength λ can be visually recognized or viewed at the predetermined viewpoint 60.

$$d \cdot \sin \theta = m\lambda \quad (1)$$

In the present embodiment, as will be described later, the groove face angle θ of each V-groove 54 is varied depending on the position of the V-groove 54. However, to make the description simple, the description herein gives an example where the groove face angles θ of all the V-grooves 54 are identical.

When the groove face angle θ of the V-groove 54 is 30 degrees, the integer m is 1, and the pitch d is 1.04 μm, the wavelength λ of the diffracted light reaching the predetermined viewpoint 60 is 520 nm. Since the light having a wavelength of 520 nm is light-blue, in this case, light-blue light can be viewed at the predetermined viewpoint 60.

When the groove face angle θ of the V-groove 54 is 30 degrees, the integer m is 1, and the pitch d is 1.10 μm, the wavelength λ of the diffracted light reaching the predetermined viewpoint 60 is 550 nm. Since the light having a wavelength of 550 nm is green, in this case, green light can be viewed at the predetermined viewpoint 60.

When the groove face angle θ of the V-groove 54 is 30 degrees, the integer m is 1, and the pitch d is 1.16 μm, the wavelength λ of the diffracted light reaching the predetermined viewpoint 60 is 580 nm. Since the light having a wavelength of 580 nm is yellow, in this case, yellow light can be viewed at the predetermined viewpoint 60.

When the groove face angle θ of the V-groove 54 is 30 degrees, the integer m is 1, and the pitch d is 1.23 μm, the wavelength λ of the diffracted light reaching the predetermined viewpoint 60 is 615 nm. Since the light having a wavelength of 615 nm is orange-colored, in this case, orange-colored light can be viewed at the predetermined viewpoint 60.

When the groove face angle θ of the V-groove 54 is 30 degrees, the integer m is 1, and the pitch d is 1.30 μm, the wavelength λ of the diffracted light reaching the predetermined viewpoint 60 is 650 nm. Since the light having a wavelength of 650 nm is red, in this case, red light can be viewed at the predetermined viewpoint 60.

In this configuration, when the groove face angles θ of all the V-grooves 54 are set at the same value at every location in the predetermined area 56, the optical path differences of the diffracted light beams reaching the predetermined viewpoint 60 are not equal, i.e., not constant. Therefore, in the case where the groove face angles θ of all the V-grooves 54 are set at the same value at all locations in the predetermined area 56, color gradation will occur in the predetermined area 56 when the predetermined area 56 is observed from the predetermined viewpoint 60.

To deal with such a situation, in the present embodiment, the groove face angle θ of V-grooves 54 is gradually varied depending on the position of the V-groove 54 so that a uniform color can be viewed (visually recognized) in the predetermined area 56 as a whole when the predetermined area 56 is observed from the predetermined viewpoint 60. That is, in the present embodiment, the groove face angle θ of V-grooves 54 is gradually varied according to the position of the V-groove 54 such that a uniform diffraction characteristic can be obtained in the predetermined area 56.

Figure 4:
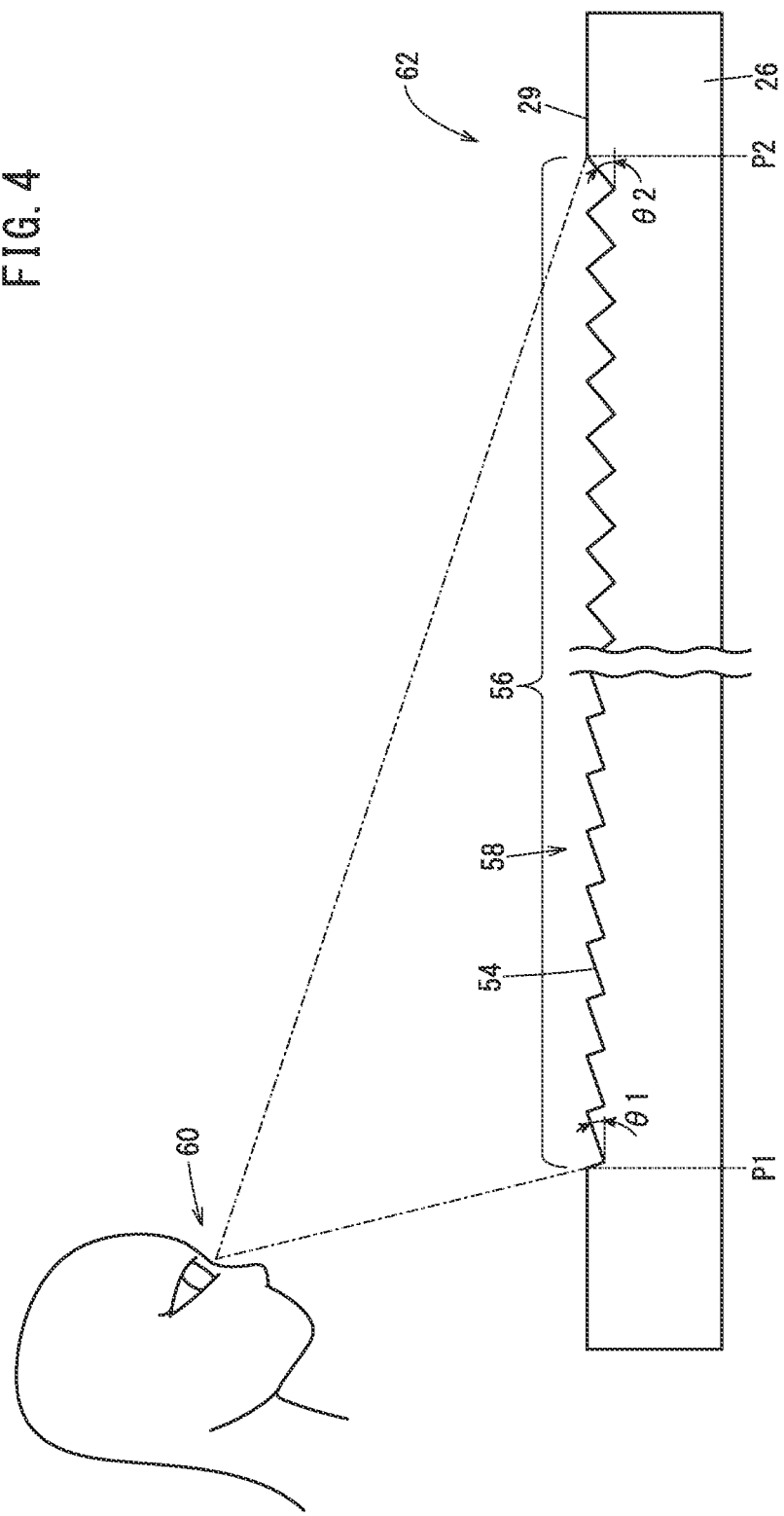
FIG. 4 is a sectional view showing an example of an object formed by the processing method according to the embodiment.

FIG. 4 is a sectional view showing an example of an object formed by the processing method according to the present embodiment. An object 62 of the present embodiment is obtained by processing (machining) the workpiece 26 by the processing method according to the present embodiment. The workpiece 26 is provided with a workpiece surface 29 made of a material containing metal. A plurality of V-grooves 54 are formed in a predetermined area 56 of the workpiece surface 29 at intervals of a fixed pitch d. A V-groove pattern 58 is formed with n V-grooves 54.

For example, let θ1 be the groove face angle of the V-groove 54 at the nearest portion P1 of the predetermined area 56. Further, the groove face angle of the V-groove 54 in the farthest portion P2 of the predetermined area 56 is set to θ2. Assuming that the number of V-grooves 54 formed in the predetermined area 56 is n, the angle difference Δθ between the groove face angles of the V-grooves 54 adjacent to each other is set as, for example, the following equation (2).

$$\Delta\theta = |\theta 1 - \theta 2|/n \quad (2)$$

When the predetermined area 56 in which the V-groove pattern 58 is formed is observed from the predetermined viewpoint 60, a specific color can be uniformly viewed in all the locations in the predetermined area 56.

The processing method according to this embodiment will be described with reference to FIG. 5. FIG. 5 is a flowchart showing the processing method according to the present embodiment.

At step S1, a workpiece 26 is set on the ultra-precision processing machine 10. More specifically, the workpiece 26 is fixed on the B-axis table 24. The workpiece surface 29 of the workpiece 26 is assumed to be parallel to the upper surface of the B-axis table 24. Then, the process proceeds to step S2.

At step S2, the control unit 42 supplies an angle command value to the drive source controller 44. The angle command value is stored in the storage unit 40 as described above. The control unit 42 reads the angle command value from the storage unit 40 and supplies the read angle command value to the drive source controller 44. When a compensation amount for the angle command value is determined beforehand, the control unit 42 compensates the angle command value read from the storage unit 40 by using the compensation amount determined in advance, and supplies the compensated angle command value to the drive source controller 44. The drive source controller 44 rotates the C-axis table 28 based on the angle command value supplied from the control unit 42, to thereby adjust the angle of the tool 30, that is, the angle of the cutting edge 34 of the tool 30. After that, the process proceeds to step S3.

At step S3, the control unit 42 appropriately drives the Z-axis moving unit 19 and the like using the drive source controller 44 to thereby form a V-groove 54 in a predetermined area 56 on the workpiece surface 29 of the workpiece 26. Then, the process proceeds to step S4.

At step S4, it is determined whether or not the formation of a V-groove pattern 58 in the predetermined area 56 has been completed. If the formation of the V-groove pattern 58 in the predetermined area 56 is not yet completed (NO at step S4), the process proceeds to step S5.

At step S5, the control unit 42 supplies a pitch command value to the drive source controller 44. The drive source controller 44 appropriately drive the X-axis moving unit 16 and the like based on the pitch command value supplied from the control unit 42 to thereby change the relative position between the workpiece 26 and the tool 30. As a result, the relative position between the workpiece 26 and the tool 30 changes in a direction intersecting the longitudinal direction of the V-groove 54. In this way, the tool 30 is placed at a position where a next V-groove 54 is to be formed. Thereafter, the process after step S2 is repeated.

When the formation of the V-groove pattern 58 in the predetermined area 56 has been completed (YES at step S4), the process shown in FIG. 5 is completed. In this way, the processing method according to the present embodiment is completed.

The compensation amount for compensating the angle command value in the ultra-precision processing machine 10 can be determined as follows. FIG. 6 is a flowchart showing a process performed to determine the compensation amount. It is noted that the process shown in FIG. 6 does not have to be performed every time before the workpiece 26 is processed. For example, when the tool 30 is fixed to the C-axis table 28 by means of the holder 32, the following process may be performed. It should be noted that compensating of the angle command value with the compensation amount can eliminate the error regarding the angle of the tool 30. The error regarding the angle of the tool 30 may be caused by the error of the tool 30 itself and the mounting error of the tool 30.

At step S11, a workpiece 26 is set on the ultra-precision processing machine 10. More specifically, the workpiece 26 is fixed on the B-axis table 24. The workpiece surface 29 of the workpiece 26 is assumed to be parallel to the upper surface of the B-axis table 24. Then, the process proceeds to step S12.

At step S12, the control unit 42 supplies an angle command value to the drive source controller 44. As described above, the angle command value is stored in the storage unit 40. The control unit 42 reads the angle command value from the storage unit 40, and supplies the read angle command value to the drive source controller 44. The drive source controller 44 rotates the C-axis table 28 based on the angle command value supplied from the control unit 42 to thereby adjust the angle of the tool 30, that is, the angle of the cutting edge 34 of the tool 30. Thereafter, the process proceeds to step S13.

At step S13, the control unit 42 appropriately drives the Z-axis moving unit 19 and the like using the drive source controller 44 to thereby form a V-groove 54 in a predetermined area 56 of the workpiece surface 29 of the workpiece 26. After that, the process proceeds to step S14.

At step S14, the groove face angle of the V-groove 54 formed in the workpiece 26 is measured using an unillustrated measuring instrument. The measuring instrument may be a contact type or a non-contact type. It is preferable that the measuring instrument can measure the groove face angle of the V-groove 54 formed in the workpiece surface 29 of the workpiece 26 with the workpiece 26 being set in the ultra-precision processing machine 10. This is because the error regarding the angle of the tool 30 can be caused by the error of the tool 30 itself and the mounting error of the tool 30, as described above. That is, when the workpiece 26 is removed from the ultra-precision processing machine 10, the error cannot always be measured well. This is why the measurement should be done in a state that the workpiece 26 is set in the ultra-precision processing machine 10. After that, the process proceeds to step S15.

At step S15, the compensation amount is calculated based on the error between the angle command value when the V-groove 54 was formed and the angle measured by the measuring instrument. The calculation of the compensation amount may be performed by the user, for example. The calculated compensation amount can be input by operating the operation unit 52. Here, the case where the user calculates the compensation amount has been described as an example, but the present invention should not be limited to this. If the angle measured by the measuring instrument is supplied to the control device 36, the calculation of the compensation amount can be performed by, for example, the control unit 42. Thereafter, the process proceeds to step S16.

At step S16, the control unit 42 stores the compensation amount in the storage unit 40. In this way, the process shown in FIG. 6 is completed.

In the above, for the sake of simplification of the description, the case where a single V-groove pattern 58 is formed in a single predetermined area 56 has been described as an example, but the present invention is not limited to this. Different V-groove patterns 58 capable of realizing different colors may be appropriately formed in a plurality of areas of the workpiece surface 29.

FIG. 7 is a sectional view showing another example of an object formed by the processing method according to the present embodiment. To simplify description, FIG. 7 shows an example of a case in which a first V-groove pattern 58A capable of producing a first color is formed in a first area 56A, and a second V-groove pattern 58B capable of producing a second color different from the first color is formed in a second area 56B.

As shown in FIG. 7, a plurality of V-grooves 54 are formed with a first pitch d1 in the first area (first predetermined area) 56A of the workpiece surface 29 of the workpiece 26. The first pitch d1 can be set so that the first color can be viewed (visually recognized) when the first area 56A is observed from the predetermined viewpoint 60. The first V-groove pattern 58A is composed of the plurality of V-grooves 54 formed in the first area 56A. The groove face angle θ of the V-grooves 54 is gradually varied depending on the position of the V-groove 54 so that the first color can be uniformly viewed at all the locations in the first area 56A when the first area 56A is observed from the predetermined viewpoint 60.

As shown in FIG. 7, a plurality of V-grooves 54 are formed in the second area (second predetermined area) 56B of the workpiece surface 29 of the workpiece 26 with a second pitch d2 different from the first pitch d1. The second pitch d2 can be set so that a second color can be viewed when the second area 56B is observed from the predetermined viewpoint 60. The second V-groove pattern 58B is composed of the plurality of V-grooves 54 formed in the second area 56B. The groove face angle θ of the V-grooves 54 is gradually varied depending on the position of the V-groove 54 such that the second color can be uniformly viewed at all the locations in the second area 56B when the second area 56B is observed from the predetermined viewpoint 60.

As described above, according to the present embodiment, the angle θ of the groove face of the V-grooves 54 is gradually varied depending on the position of the V-groove 54 so that a uniform color can be viewed at all the locations in the predetermined area 56 when the predetermined area 56 is observed from the predetermined viewpoint 60. Therefore, according to the present embodiment, a V-groove pattern 58 that enables a uniform color to be visually recognized can be obtained.

[Modification]

Though the preferred embodiment of the present invention has been described above, the present invention is not limited to the above embodiment, and various modifications can be made without departing from the gist of the present invention.

For example, the above-described processing may be performed on each of a large number of predetermined areas 56 obtained by dividing a region into small areas. The above processing on each of a large number of predetermined areas 56 obtained by dividing a region into small areas makes it possible to realize a visual representation such as a painting, for example.

The above embodiments can be summarized as follows.

A processing method includes: a step (S1) of setting a workpiece (26) having a workpiece surface (29) made of a material containing metal, on a precision processing machine (10); and a forming step (S2 to S5) of forming a plurality of grooves (54) having a V-shaped cross-section, at intervals of a constant pitch (d) in a predetermined area (56) on the workpiece surface, using a tool (30) provided in the precision processing machine to thereby form a V-groove pattern (58) made up of the plurality of grooves, in the predetermined area. In the forming step, each time one of the grooves is formed, the relative position between the tool and the workpiece is moved in a direction intersecting the longitudinal direction of the groove, and each time the groove is formed, the angle (θ) of the groove face of the groove is gradually varied so that a uniform color can be visually recognized in every location in the predetermined area when the predetermined area is observed from a predetermined viewpoint (60). This configuration makes it possible to provide a V-groove pattern that enables a uniform color to be visually recognized.

In the above processing method, a pitch command value, which is a command value as to the pitch between the grooves in the precision processing machine, may be set by a unit of 0.1 nm or less. According to this configuration, since the unit of the pitch command value is markedly small, the pitch of the grooves (54) can be set with extremely high precision. Thus, this configuration makes it possible to produce a V-groove pattern that enables a more uniform color to be visually recognized.

In the above processing method, an angle command value, which is a command value as to the angle of the groove face in the precision processing machine, may be set by a unit of 0.000001 degrees or less. According to this configuration, since the unit of the angle command value is markedly small, the angle of the groove face can be set with extremely high precision. Thus, this configuration makes it possible to produce a V-groove pattern that enables a more uniform color to be visually recognized.

The above processing method may further include a determination step (S11 to S16) of determining a compensation amount for compensating an angle command value which is a command value as to the angle of the groove face in the precision processing machine. The determination step may include a step (S14) of measuring the angle of the groove face of the groove formed on the workpiece surface of the workpiece by the tool, with a measuring instrument, a step (S15) of calculating the compensation amount based on an error between the angle measured by the measuring instrument and the angle command value designated when the groove was formed, and a step (S16) of storing the compensation amount in a storage unit (40) provided in the precision processing machine. In the forming step, the grooves may be formed in accordance with the angle command value compensated based on the compensation amount stored in the storage unit. With this configuration, the angle of the groove face can be set with higher precision. Thus, it is possible to produce a V-groove pattern that enables a more uniform color to be visually recognized.

In the above processing method, in the forming step, a plurality of the grooves are formed in a first area (56A) on the workpiece surface at intervals of a first pitch (d1) so that a uniform first color can be visually recognized in every location in the first area, and a plurality of the grooves are formed in a second area (56B) that is different from the first area on the workpiece surface at intervals of a second pitch (d2) that is different from the first pitch so that a uniform second color can be visually recognized in every location in the second area, the second color being different from the first color. With this configuration, a uniform color can be visually recognized in each of the multiple areas.

In the above processing method, the tool may be a single crystal diamond tool bit.

An object (62) has a workpiece surface made of a material containing metal. The object includes a V-groove pattern formed in a predetermined area on the workpiece surface. The V-groove pattern has a plurality of grooves of a V-shaped cross-section. The grooves are formed at intervals of a constant pitch. The angle of the groove face of the groove is gradually varied depending on the position of the groove so that a uniform color can be visually recognized in every location in the predetermined area when the predetermined area is observed from a predetermined viewpoint.

In the above object, a first V-groove pattern (58A) having a plurality of the grooves formed at intervals of a first pitch is formed in a first area on the workpiece surface, and the angle of the groove face of the groove of the first V-groove pattern is gradually varied depending on the position of the groove so that a uniform first color is visually recognizable in every location in the first area when the first area is observed from the predetermined viewpoint, and a second V-groove pattern (58B) having a plurality of the grooves formed at intervals of a second pitch that is different from the first pitch is formed in a second area on the workpiece surface, the second area being different from the first area, and the angle of the groove face of the groove of the second V-groove pattern is gradually varied depending on the position of the groove so that a uniform second color is visually recognizable in every location in the second area when the second area is observed from the predetermined viewpoint, the second color being different from the first color.

What is claimed is:

1. A processing method, comprising:
    a step of setting a workpiece having a workpiece surface made of a material containing metal, on a precision processing machine; and
    a forming step of forming a plurality of grooves having a V-shaped cross-section, at intervals of a constant pitch in a predetermined area on the workpiece surface, using a tool provided in the precision processing machine to thereby form a V-groove pattern comprising the plurality of grooves, in the predetermined area, wherein
    in the forming step, each time one of the grooves is formed, relative position between the tool and the workpiece is moved in a direction intersecting a longitudinal direction of the groove, and each time the groove is formed, an angle of a groove face of the groove is gradually varied so that a uniform color is visually recognizable in every location in the predetermined area when the predetermined area is observed from a predetermined viewpoint.

2. The processing method according to claim 1, wherein a pitch command value, which is a command value as to the pitch between the grooves in the precision processing machine, is set by a unit of 0.1 nm or less.

3. The processing method according to claim 1, wherein an angle command value, which is a command value as to the angle of the groove face in the precision processing machine, is set by a unit of 0.000001 degrees or less.

4. The processing method according to claim 1, further comprising a determination step of determining a compensation amount for compensating an angle command value which is a command value as to the angle of the groove face in the precision processing machine, wherein:
    the determination step includes a step of measuring the angle of the groove face of the groove formed on the workpiece surface of the workpiece by the tool, with a measuring instrument, a step of calculating the compensation amount based on an error between the angle measured by the measuring instrument and the angle command value designated when the groove was formed, and a step of storing the compensation amount in a storage unit provided in the precision processing machine; and
    in the forming step, the grooves are formed in accordance with the angle command value compensated based on the compensation amount stored in the storage unit.

5. The processing method according to claim 1, wherein, in the forming step, a plurality of the grooves are formed in a first area on the workpiece surface at intervals of a first pitch so that a uniform first color is visually recognizable in every location in the first area, and a plurality of the grooves are formed in a second area that is different from the first area on the workpiece surface at intervals of a second pitch that is different from the first pitch so that a uniform second color is visually recognizable in every location in the second area, the second color being different from the first color.

6. The processing method according to claim 1, wherein the tool is a single crystal diamond tool bit.

7. An object having a workpiece surface made of a material containing metal, the object comprising a V-groove pattern formed in a predetermined area on the workpiece surface, the V-groove pattern having a plurality of grooves of a V-shaped cross-section which are formed at intervals of a constant pitch, wherein an angle of a groove face of the groove is gradually varied depending on a position of the groove so that a uniform color is visually recognizable in every location in the predetermined area when the predetermined area is observed from a predetermined viewpoint.

8. The object according to claim 7, wherein:
    a first V-groove pattern having a plurality of the grooves formed at intervals of a first pitch is formed in a first area on the workpiece surface, and the angle of the groove face of the groove of the first V-groove pattern is gradually varied depending on the position of the groove so that a uniform first color is visually recognizable in every location in the first area when the first area is observed from the predetermined viewpoint; and
    a second V-groove pattern having a plurality of the grooves formed at intervals of a second pitch that is different from the first pitch is formed in a second area on the workpiece surface, the second area being different from the first area, and the angle of the groove face of the groove of the second V-groove pattern is gradually varied depending on the position of the groove so that a uniform second color is visually recognizable in every location in the second area when the second area is observed from the predetermined viewpoint, the second color being different from the first color.

* * * * *